United States Patent [19]

Roof

[11] 3,780,234

[45] Dec. 18, 1973

[54] LOCK FOR PRESS BUTTON TELEPHONE

[75] Inventor: John K. Roof, Sun City, Ariz.

[73] Assignee: Woodrow T. Morrow, Paradise Valley, Ariz.

[22] Filed: Apr. 20, 1972

[21] Appl. No.: 245,947

[52] U.S. Cl. .................. 179/189 R
[51] Int. Cl. .................. H04m 1/66
[58] Field of Search .................. 179/189 R, 189 D, 179/14

[56] References Cited

UNITED STATES PATENTS

| | | | |
|---|---|---|---|
| 2,642,501 | 6/1953 | Hall et al. | 179/189 R |
| 2,641,659 | 6/1953 | Benson | 179/189 R |
| 3,598,931 | 8/1971 | Foote | 179/189 R |

*Primary Examiner*—Thomas W. Brown
*Attorney*—Warren F. B. Lindsley

[57] ABSTRACT

A lock for prohibiting the transmitting of outgoing telephone calls on a Touch Tone telephone without interferring with incoming calls.

3 Claims, 2 Drawing Figures

PATENTED DEC 18 1973 3,780,234

LOCK FOR PRESS BUTTON TELEPHONE

BACKGROUND OF THE INVENTION

This invention is directed to telephones and more particularly to Touch Tone telephones. Touch Tone telephones are the latest hand set types which complete a call by making desired connections at a telephone central office by pressing and releasing a plurality of plungers on a numerical face plate on a telephone receiver. When the plungers are depressed on the hand set and then released this action alternately opens and closes circuits of the subscriber's line, the number depending upon the tones created by the various plungers depressed and released. When the plungers are pressed out of their normal positions and released, springs automatically move them back to their normal positions individually. In moving back, mechanisms associated with the plungers alternately open and close the circuit of the subscriber's line, the number depending upon the plunger depressed, as well known in the art. The electrical impulses thus generated are transmitted to the central office where they control the movement of an electromechanical device called a selector through which the subscriber's line is connected to other selective mechanisms. Each successive digit formed by the plunger produces another series of such impulses which advance the call one step toward completion until the final operation occurs whereby connection is made to the called telephone.

DESCRIPTION OF THE PRIOR ART

The use of Touch Tone telephones is being gradually extended in this country and in all parts of the world. Additionally, the Touch Tone telephones are so perfected that toll calls can be made directly by the caller or subscribed through new central station equipment. However, the subscriber may not authorize the caller to make such toll or local calls and thus he is charged for calls he knows nothing about.

SUMMARY OF THE INVENTION

In accordance with the invention claimed a new locking method and apparatus is provided which selectively may lock the hand set so that no outgoing calls may be made without prohibiting incoming calls to that hand set.

It is, therefore, one object of this invention to provide an improved locking method and apparatus for hand sets which when set prohibits all outgoing calls without prohibiting incoming calls.

Another object of this invention is to provide a locking mechanism for Touch Tone telephones which snugly fits into the present day Touch Tone hand set housings.

A further object of this invention is to provide an improved Touch Tone telephone locking mechanism which interlocks with a cavity in the present day hand sets avoiding easy removal and tampering with the telephone.

A still further object of this invention is to provide an improved locking mechanism for Touch Tone telephones which may be readily attached to present day hand sets with a minimum of connections.

A still further object of this invention is to provide an encapsulated locking mechanism for fitting into a cavity of a Touch Tone telephone hand set which is economical to manufacture and install.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWING

The present invention may be more readily described by reference to the accompanying drawing in which.

DESCRIPTION OF THE PREFERRED EMBODIMENT

Figure 1:
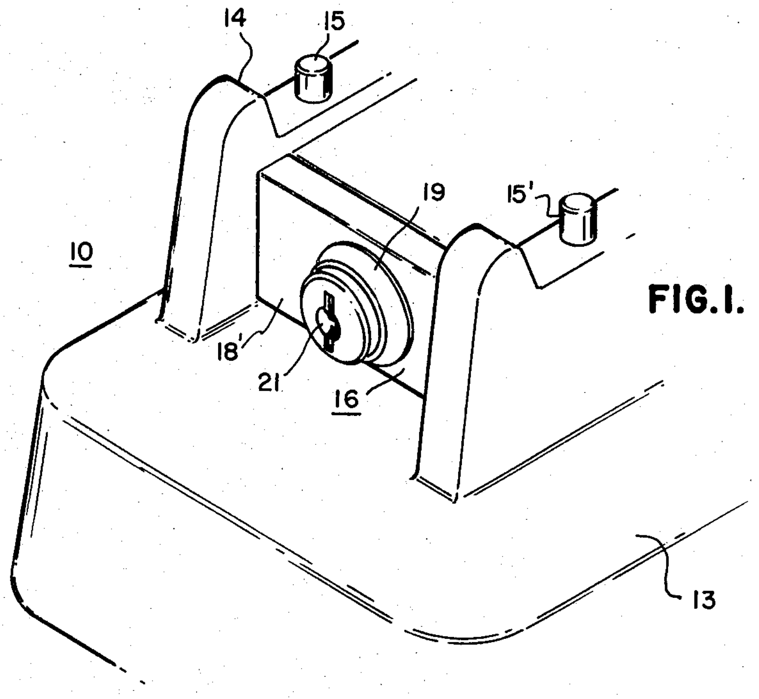
FIG. 1 is partial perspective view of a Touch Tone telephone hand set illustrating the front view of the locking mechanism.
Figure 2:
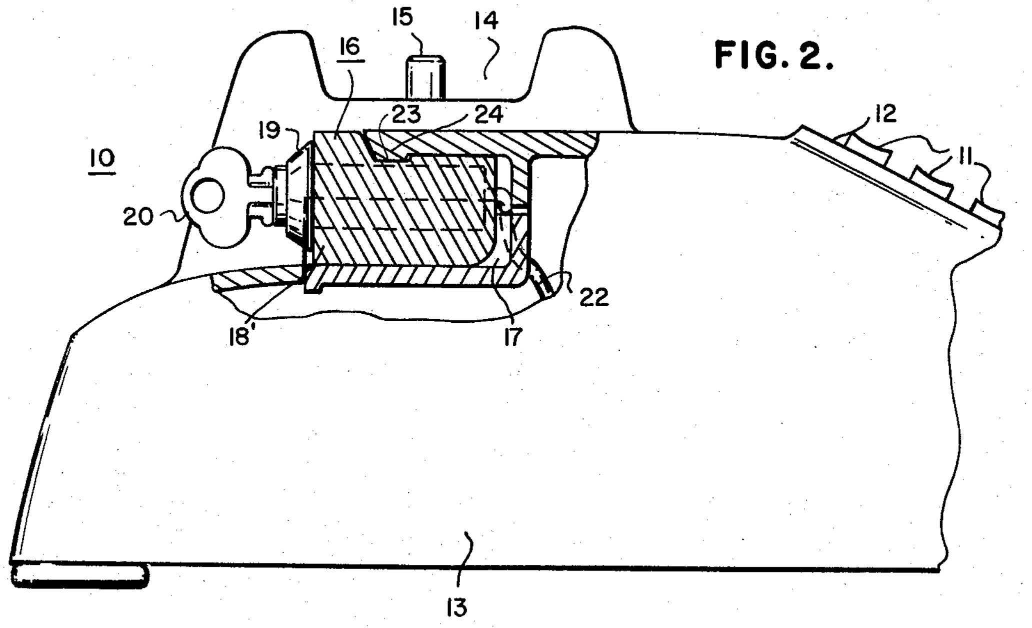
FIG. 2 is a partial side view of the hand set shown in FIG. 1 partly in section showing details of the locking mechanism.

Referring more particularly to the drawing by characters of reference, FIGS. 1 and 2 disclose a Touch Tone hand set type telephone 10 comprising the usual and well known transmitter and receiver of electrical impulses and converter of such impulses into audio sounds. Since telephone 10 is well known it will not be described further except to note that the telephone has an electrical circuit interconnecting a source of power to the Touch Tone button type plungers 11 mounted on the face 12 of housing 13 of the telephone which can be interrupted by an on-off switch, if so desired, to control the transmission of electrical pulses from the telephone to a central station for transmission to other like telephones.

Although the telephone shown does not have a hand held speaker and receiver shown such part of the telephone would be used and placed in the cradle 14 of housing 13 in a well known manner. The push buttons 15, 15' when depressed by the receiver (not shown) positions the telephone circuits in a condition for receiving incoming calls. In their upward positions shown, which they assume when the receiver is out of the cradle, they condition the circuits in the telephone for transmitting outwardly of the telephone and complete circuits for receiving and transmitting impulses convertable to audio sounds.

In order to prevent an unauthorized caller from calling out from a given Touch Tone telephone 10, a new locking means 16 is provided for fitting into an existing cavity 17 in housing 13. This cavity forming a part of the present day Touch Tone telephone is closed by the locking means 16.

Locking means 16 comprises a housing 18' formed of a suitable plastic or like moldable material which encapsulates at least a part of a key actuated switching means 19. Switching means 19 merely makes and brakes an electric circuit, in a well known manner, by the movement of a removable key 20 in a slot 21 in the locking means. A pair of lead wires 22 connected across the circuit connecting the plungers 11 to the telephone circuitry are connected to the switching elements of the locking means 16 in a well known manner.

Thus, as the key 20 is turned in the key slot 21 in locking means 16, the circuitry connecting plungers 11 and their mechanisms of telephone 10 are completed so that calls may be transmitted out from the telephone.

Incoming calls are not affected since the locking means controls only the circuitry associated with selecting desired numbers or placing of outgoing calls by the Touch Tone system.

It should be noted that the housing 18' surrounding the locking means 16 is formed with an indentation 23 which interlocks with a protrusion 24 in the telephone housing 13 so that the locking means when once installed in a telephone can not be readily removed by unauthorized personnel.

Although but one embodiment of the present invention has been illustrated and described, it will be apparent to those skilled in the art that various changes and modifications may be made therein without departing from the spirit of the invention or from the scope of the appended claims.

What is claimed is:

1. A telephone comprising:

a first housing, said housing defining a cradle for receiving the known telephone ear and mouth receiver and defining a cavity below said cradle, and a locking means for controlling outgoing calls from said telephone, said locking means comprising a key actuated switch, and a second housing surrounding and encapsulating said switch, said switch defining a key slot at one end thereof and having a pair of wires leading from another portion thereof, said second housing encapsulating said switch exposing said key slot at one end and said wires from another end, said locking means being arranged to fit snuggly into said cavity, said wires passing from said cavity into said telephone for interconnecting push buttons of said telephone with outgoing telephone circuitry.

2. The telephone set forth in claim 1 in further combination with:

means for interlocking said second housing of said locking means with the periphery of said cavity of said first housing.

3. The telephone set forth in claim 2 wherein said means for interlocking said second housing of said locking means with the cavity in said first housing comprises a notch in the outer periphery of said second housing and a cooperating protrusion in the cavity of said first housing.

* * * * *